United States Patent [19]

Kim et al.

[11] Patent Number: 4,716,469
[45] Date of Patent: Dec. 29, 1987

[54] CIRCUIT FOR EYESIGHT PROTECTION IN A TELEVISION SET

[75] Inventors: Eui D. Kim; Hyun J. Choi, both of Kumi, Rep. of Korea

[73] Assignee: Gold Star Co., Ltd., Seoul, Rep. of Korea

[21] Appl. No.: 868,246

[22] Filed: May 29, 1986

[30] Foreign Application Priority Data

Oct. 25, 1985 [KR] Rep. of Korea ............... 14051/1985

[51] Int. Cl.$^4$ ............................................. H04N 5/65
[52] U.S. Cl. .................................. 358/245; 358/194.1; 340/557; 455/603
[58] Field of Search ......................... 358/245, 194.1; 340/555, 557; 455/603

[56] References Cited

U.S. PATENT DOCUMENTS 4,417,278 11/1983 Hemsleigh et al. ............... 358/245

Primary Examiner—Edward L. Coles, Sr.
Attorney, Agent, or Firm—Birch, Stewart, Kolasch & Birch

[57] ABSTRACT

This disclosure depicts a circuit for protecting eyesight from the screen of a TV set. A infrared transmitter is provided on a side of the front of the TV set so that pulse signals therefrom are received on a receiving-amplifying portion for remote control already installed in the TV set after reflecting upon a viewer within a predetermined distance from the TV screen. A monostable multivibrator has an input for receiving pulse output signals from the remote control receiving-amplifying portion in response to reflected pulse signals applied thereto and also has an output. A delay circuit portion has an input operatively connected to output of the monostable circuit portion and also has an output, producing the level signals on the ouput thereof when higher level signals are applied on its input over a predetermined time and otherwise producing lower level signals. A video amplifier driving circuit portion for controlling the "ON" and "OFF" of an video amplifier has an input operatively connected to the output of the delay circuit portion and also has an output selectively disabling the video amplifier in response to the occurrence of reflected pulse signals for a predetermined period of time.

5 Claims, 2 Drawing Figures

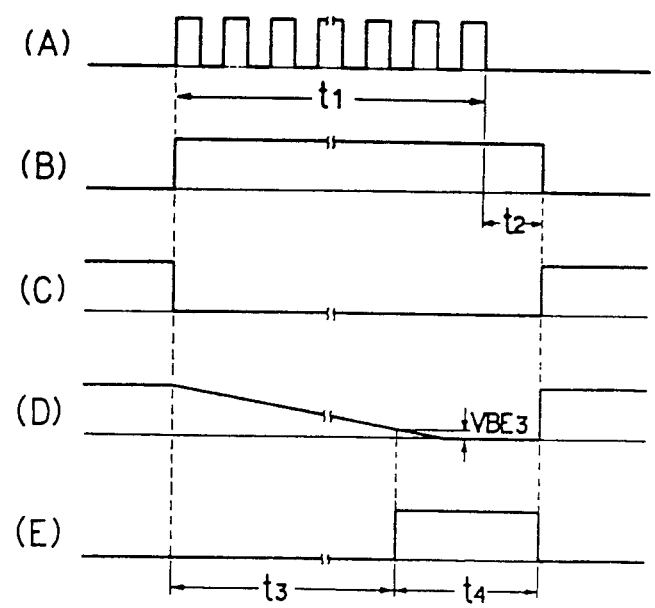

CIRCUIT FOR EYESIGHT PROTECTION IN A TELEVISION SET

BACKGROUND OF THE INVENTION

The present invention relates to an eyesight protection circuit of a TV set, and more particularly to an eyesight protection circuit by which the screen of a TV set goes blank, in case a TV viewer approaches into a predetermined distance from the TV set and the picture reappears when that viewer moves beyond that predetermined distance. The protection circuit has an infrared transmitter and receiver on the front of the TV set. Furthermore, this invention relates to an eyesight protection circuit by which the screen of a television set goes blank in case a viewer is positioned over a predetermined time within a predetermined distance from the screen.

The prior art to which the invention is directed includes the art of an eyesight protection circuit being of a type in which the screen of a TV set disappears, interpreting a TV viewer positioned within a predetermined distance from the TV set, when the signals uniformly amplified in the infrared receiver of the TV set are over a predetermined level.

However, there are some inevitable defects in this prior art; there may be a lot of deflections on the levels of the infrared receiver signls depending on reflecting materials, it is impossible to regulate the screen conditions and select a channel due to extinguishment of the screen even during the above regulation and selection operations, and there is the problem of a higher cost due to the requirement of respective infrared transmitter and receiver. See Korean Utility Model Reg. No. 30909 of May 2, 1986.

Furthermore, the other prior art to which the invention is directed includes the art indicating the approaches of a viewer by displaying a horizontal or a perpendicular bar on the screen in case the viewer or children approach near the TV set. See Korean Utility Model Application Filing No. 84-6720 of July 13, 1984; Early Publication No. 86-2086, Mar. 1, 1986; Early Publication Gazette No. 2. However, these screen variations arouse children's curiosity stimulating the children to approach near the screen of the TV set, therby not being able to obtain the desired result of protecting eyesight from the TV screen.

Accordingly, it is an object of the invention to provide an eyesight protection circuit for detecting a viewer within in a predetermined distance without errors to improve the effect of eyesight protections, by checking the existance of signal pulse of the infrared receiver, unlike the prior art comparing the signal levels thereof.

A further object of the invention is to lower the cost, by installing additionally only the infrared transmitter and substituting the remote control receiver already installed in the TV set for the infrared receiver.

These objects of this invention can be accomplished by letting infrared pulse signals, output from the infrared transmitter provided on the front of the TV set, be received on the remote control receiver already installed in the TV set afte they are reflected from the viewer positioned within a predetermined distance; discriminating a viewer positioned within a predetermined distance from the TV set while driving a monostable multivibrator by the above infrared pulse signals received on the remote control receiver; extinguishing the picture on the TV screen by inactivating the video amplifier when the monostable multivibrator is continuously driven over the predetermined time by the infrared pulse signals applied on it; and letting the picture reappear on the screen by operating the video amplifier when the monostable multivibrator is rested due to non-applying of the infrared pulse signals to it.

BRIEF DESCRIPTION OF DRAWINGS

The invention will become more readily apparent from the following description of a preferred embodiment thereof shown, by way of example only in the accompanying drawings, in which:

FIG. 2 is a wave form chart of the output of each portion.

DESCRIPTION OF THE INVENTION

Figure 1:
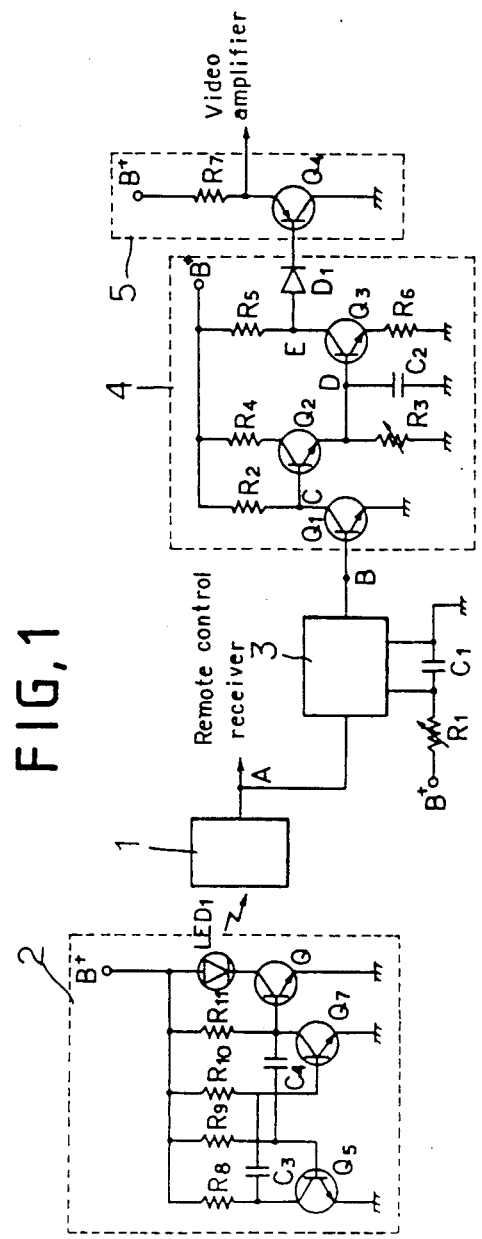
FIG. 1 is an eyesight protection circuit diagram embodying the invention.

Referring first to FIG. 1, there is shown an eyesight protection circuit diagram of the present invention. As illustrated in FIG. 1, the present invention resides in an eyesight protection circuit of a TV set having a remote control receiving amplifying portion 1, characterized in that an infrared transmitter 2 comprising a light-emitting diode $LED_1$, transistors $Q_5$-$Q_7$, resistors $R_8$-$R_{11}$ and condenser $C_3$ and $C_4$ is installed on a side of the front of the TV set, so that the infrared pulse signals emitted from the infrared transmitter 2 can be received on the remote control receiving-amplifying portion after they are reflected from the viewer. An output A connected to the remote control receiver portion of the remote control receiving-amplifying portion 1 is connected with the input of a monostable multivibrator 3 having a predetermined time set by means of variable resistor $R_1$ and condenser $C_1$. An output B of the monostable multi-vibrator 3 is connected with the input of a delay circuit portion 4 having transistors $Q_1$-$Q_3$, resistors $R_2$-$R_6$, a condenser $C_2$ and an output diode $D_1$. The output of the delay circuit portion 4 via the diode is connected with the base of a grounded-collector transistor $Q_4$ of a video amplifier driving circuit 5 adapted to drive the video amplifier of the TV set (not shown) when lower level signals are produced on the emitter of the transistor $Q_4$, which is output of the video amplifier driving circuit 5, and not to drive the video amplifier when the higher level signals are produced at the emitter of the transistor $Q_4$.

Referring to FIG. 2, there is shown a wave form chart of the output of each portion of this invention. The infrared pulse signals are successively produced from the infrared transmitter 2 and emitted toward the front of a TV set if a power source B+ is supplied. At this point, if a viewer is positioned within a predetermined distance from the TV set, the infrared pulse signals emitted from the infrared transmitter 2 are reflected from the viewer and received on the remote control receiving-amplifying portion 1, on the output A of which the pulse signals are successively supplied during his stay time $t_1$, as shown in waveform (A) of FIG. 2. The pulse signals from the output A are applied to the remote control receiver and simultaneously to the input of the monostable multivibrator 3 to check the existence of the viewer within the predetermined distance. On the output B of the monostable multivibrator 3 higher level signals are successively supplied by time constant $t_2$, determined by its variable 5 registor $R_1$ and condenser $C_1$, as shown in waveform (B) of FIG. 2. If the viewer leaves or is outside of the predetermined distance from the TV set and the pulse signal is not supplied on the input of the monostable multivibrator 3, lower level signals are produced from the output B thereof after a time $t_2$ determined by the time constant of the variable resistor $R_1$ and condenser $C_1$.

Accordingly, the transistor $Q_1$ of the delay circuit portion 4 is turned "ON" while the higher level signals are produced on the output B of the monostable multi-vibrator 3 and on the collector portion C of the transistor $Q_1$ the lower level signals are produced as shown in waveform (C) of FIG. 2, thereby turning transistor $Q_2$ "OFF". The charging voltage of the condenser $C_2$ is discharged through the variable resistor $R_3$ and the emitter resistor $R_6$ of a transistor $Q_3$ from the point of the "OFF" of the transistor $Q_2$, so that the charging voltage is gradually reduced as shown in waveform (D) of FIG. 2. When the charging voltage of the condenser $C_2$ is discharged below the operating voltage $V_{BE3}$ of the transistor $Q_3$, the transistor $Q_3$ is turned "OFF" so that the higher level signals are produced on the collector portion E thereof as shown in waveform (E) of FIG. 2, a condition in which the higher level signals output via the output diode $D_1$ turn "OFF" the transistor $Q_4$ of the video amplifier driving circuit portion 5 so that higher level signals are also produced on the collector thereof. Then these higher level signals are applied on the video amplifier and cause the driving thereof to be stopped, thereby extinguishing the picture on the TV screen. The aural signal remains of course produced, only the picture being extinguished.

However, when the viewer moves outside of the predetermined distance from the TV set before the time $t_3$, in which the charging voltage of the condenser $C_2$ in the delay circuit portion 4 being discharged drops below the operating voltage $V_{BE3}$ of the transistor $Q_3$, lower level signals are produced on the output of the monostable multivibrator. These lower level signals turn "OFF" the transistor $Q_1$ of the delay circuit portion 4 so that the higher level signals are produced on the collector thereof and turn ON on the transistor $Q_2$ and thereby directly raise the charging voltage of the condenser $C_2$. Accordingly, the transistor $Q_3$ remains "ON" so that the lower level signals are produced on the collector thereof to keep "ON" the transistor $Q_4$ of the video amplifier driving circuit portion 5, at which time lower level signals are produced on the collector thereof so that the video amplifier remains driven, thereby maintaining the picture on the TV screen.

Thus, a viewer can approach the TV set and adjust a receiving channel and the screen conditions while watching the screen within the discharging time $t_3$, since the picture will remain on the screen by continued driving of the video amplifier during the discharging time $t_3$ as determined by the time constant of the condenser $C_2$ and the variable resistor $R_3$ in the delay circuit portion 4 even if higher level signals are produced on the output of the monostable multivibrator 3 by the viewer's stay within the predetermined distance from the TV set. In addition to this, the present invention is not affected even by the output signal of the remote control receiving-amplifying portion 1 according to the operation of a remote controller. Furthermore, the discharging time $t_3$ may be adjusted by varying the values of the condenser $C_2$ and the resistor $R_3$ to change the time constant thereof.

As set forth herein before, when a viewer stays over the delay time of the delay circuit portion 4 within the predetermined distance from a TV set, the screen of the TV set is extinguished. If the viewer retires out of the predetermined distance, at this point, the lower level signals are produced on the output B of the monstable multi-vibrator 3 after the time $t_2$ as determined by the time constant of the variable resistor $R_1$ and condenser $C_1$ thereof since pulse signals are not being produced on the output A of the remmote control receiving-amplifying portion 1. Thus, the transistor $Q_1$ of the delay circuit portion 4 is turned "OFF" and the transistor $Q_2$ thereof is turned "ON" so that the charging voltage of the condenser $C_2$ is maintained over the operating voltage $V_{BE3}$ of the transistor $Q_3$, thereby turning "ON" the transistor $Q_3$. Accordingly, the transistor $Q_4$ of the video amplifier driving circuit portion 5 is turned "ON" so that the lower level signals are produced on the emitter thereof and the video amplifier is driven again, thereby presenting picture on the TV screen.

The present invention operating as set forth in above will be able to improve the effect of eyesight protection, by interpreting whether a viewer is positioned within a predetermined distance or not by checking the existence of the infrared receiving signal pulses, unlike the prior art comparing the levels thereof. Furthermore, the picture on the screen of a TV set can be maintained during a predetermined time even if a viewer is positioned within a predermined distance from the TV set, so that the viewer can adjust the receiving channel and screen conditions during that predetermined time while watching the screen. Additionally, the present invention may substitute the remote control receiving apparatus already installed in a TV set for an infrared receiver, so that it has the effect of lowering the production cost.

The invention is not limited to the particular details of the circuit depicted, and other modifications and applications may be contemplated. Certain other changes may be made in the above described circuit without departing from the true spirit and scope of the invention herein involved. It is intended therefor, that the subject matter in the above depiction shall be interpreted as illustrative and not in a limiting sense.

What is claimed is:

1. An eyesight protection circuit for a television set having a remote control infrared signal receiving-amplifying portion 1, characterized by an infrared transmitter 2 installed in a front side of said television set so that the infrared pulse signals emitted from said infrared transmitter 2 are received on said remote control receiving-amplifying portion 1 after reflecting upon a viewer within a predetermined distance of the screen of said television set, said remote control receiving-amplifying portion 1 having an output interconnected to the input of a monostable multivibrator 3 to apply there to output signals from said remote control receiving-amplifying portion 1 in response to the signals reflected from the viewer, a delay circuit portion 4 having an input adapted to interconnected to the output of said monostable multivibrator 3 outputting higher level signals when higher level signals are applied on the input thereof over a predetermined time and otherwise outputting lower level signals, and a video amplifier driving circuit portion 5 for controlling the "ON" and "OFF" of a video amplifier in response to said ower and higher level signals respectively, having an input interconnected to the output of said delay circuit portion and an output adopted to be connected to a said video amplifier associated with said television set.

2. Eyesight protection means for television sets comprising:

infrared remote control signal receiving and amplifying means;

infrared transmitter means on a said television set adjacent the front side thereof for transmitting infrared pulse signals into a detection area defined by a predetermined distance outward from the screen of a said television set, said infrared pulse signals being reflected from the body of a viewer entering said detection area;

said infrared remote control signal receiving and amplifying means receiving said reflected pulse signals from a said viewer and providing an output in response thereto;

delay circuit means responsive to said output and the existence thereof for a predetermined time interval providing a disabling output indicative of the an undesirable proximity of a viewer to the said television screen; and video control means responsive to said disabling output for extinguishing a picture on said television screen pending exit of said viewer from said detection area.

3. The eyesight protection means of claim 2, wherein said delay circuit means comprises:

one-shot multivibrator means having a first time constant providing an intermediate output pulse of a duration dependent upon the intrusion time of a viewer within said detection area; and delay means receiving said intermediate output and providing output signals of a first output level in response to a duration of said intermediate signal in excess of a predetermined safe intrusion time of a said viewer within said detection space in the provision of said disabling output and otherwise providing signals of a different output level.

4. The eyesight protection means of claim 3, wherein said safe intrusion time is greater than a time permitting intrusion into said detection area by a viewer for the purpose of manually adjusting a said television set.

5. The eyesight protection means of claim 2, wherein said predetermined time interval is greater than a time permitting intrusion into said detection area by a viewer for the purpose of manually adjusting a said television set.

* * * * *